United States Patent
Stewart et al.

(10) Patent No.: US 11,215,378 B2
(45) Date of Patent: Jan. 4, 2022

(54) SYSTEMS AND METHODS FOR CONTROLLING A CLIMATE CONTROL SYSTEM

(71) Applicant: Trane International Inc., Davidson, NC (US)

(72) Inventors: Jeffrey L. Stewart, Tyler, TX (US); Drew Whitehurst, Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 16/868,052

(22) Filed: May 6, 2020

(65) Prior Publication Data

US 2021/0348794 A1 Nov. 11, 2021

(51) Int. Cl.
| | |
|---|---|
| F24F 11/64 | (2018.01) |
| F24F 11/54 | (2018.01) |
| G05B 19/042 | (2006.01) |
| F24F 11/65 | (2018.01) |
| F24F 11/56 | (2018.01) |
| F24F 110/10 | (2018.01) |

(52) U.S. Cl.
CPC .............. *F24F 11/64* (2018.01); *F24F 11/54* (2018.01); *F24F 11/56* (2018.01); *F24F 11/65* (2018.01); *G05B 19/0426* (2013.01); *F24F 2110/10* (2018.01); *F24F 2221/38* (2013.01); *G05B 2219/2614* (2013.01)

(58) Field of Classification Search
CPC ... F24F 11/62; G05B 2219/2642; G05B 9/03; G05B 19/0428; G05B 19/4184; G05B 19/0421; G05B 2219/24182; G05B 2219/24186; G05B 2219/24187; G05B 2219/14113; G05B 2219/24188; G05B 2219/34482; H05B 41/36
See application file for complete search history.

(56) References Cited

U.S. PATENT DOCUMENTS

| | | | |
|---|---|---|---|
| 8,001,085 B1 * | 8/2011 | Kiselev | G06F 11/2071 |
| | | | 707/639 |
| 8,078,326 B2 | 12/2011 | Harrod et al. | |
| 8,117,862 B2 | 2/2012 | Helt et al. | |
| 8,725,299 B2 | 5/2014 | Hess et al. | |
| 9,441,846 B2 * | 9/2016 | Mauk | G01R 21/00 |
| 2007/0168058 A1 * | 7/2007 | Kephart | G06F 11/2028 |
| | | | 700/82 |
| 2014/0297042 A1 * | 10/2014 | Kowald | F24F 11/62 |
| | | | 700/276 |
| 2017/0277607 A1 * | 9/2017 | Samii | G06F 11/2028 |
| 2020/0072483 A1 * | 3/2020 | Snider | F25B 49/02 |

FOREIGN PATENT DOCUMENTS

JP 5391193 B2 10/2013

* cited by examiner

*Primary Examiner* — Darrin D Dunn
(74) *Attorney, Agent, or Firm* — Womble Bond Dickinson (US) LLP

(57) ABSTRACT

Methods and related systems are disclosed for retrieving personality data for a first unit a climate control system. In an embodiment, the method includes querying a second unit controller that has replaced the first unit controller. In addition, the method includes determining that the second unit controller lacks personality data that is unique to the first unit. Further, the method includes transferring the personality data to the second unit controller from a memory of the climate control system that is separate from the second unit controller.

20 Claims, 3 Drawing Sheets

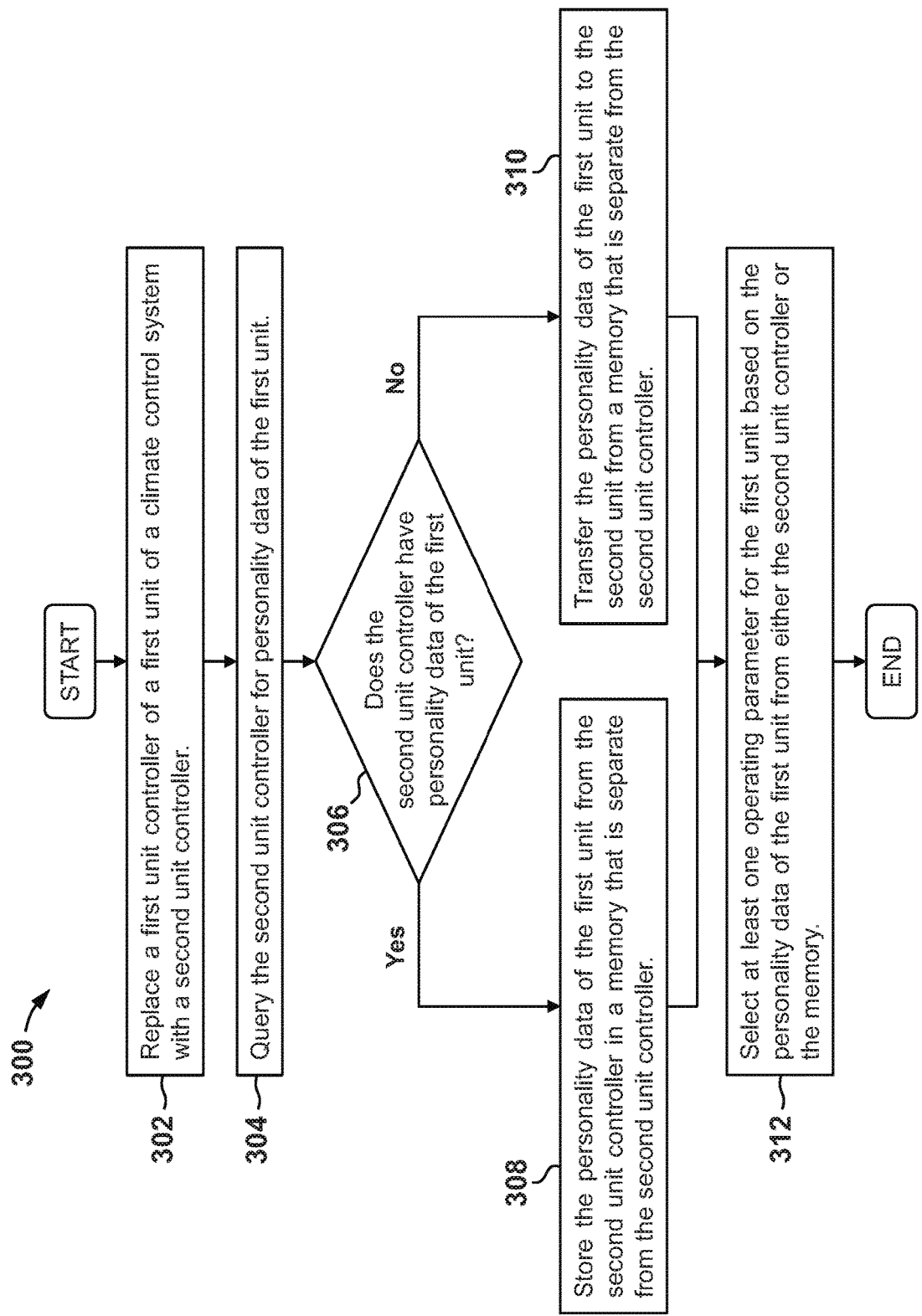

SYSTEMS AND METHODS FOR CONTROLLING A CLIMATE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A climate control system, such as a heating, ventilation, and air-conditioning (HVAC) system, may control the environmental conditions (e.g., temperature, relative humidity, etc.) of an indoor space. A climate control system may include one or more units (e.g., evaporation unit, condensing unit, furnace unit, etc.) that operate, often in concert, to adjust or maintain the climate conditions in a defined space during operations. In addition, a climate control system may also include one or more controllers that are configured to communicate with the one or more units so as to direct the operation of the units to ultimately support the climate control system's functionality and performance.

BRIEF SUMMARY

Some embodiments disclosed herein are directed to a method of repairing a climate control system that includes a system controller and a first unit. The first unit includes a first unit controller separate from the system controller. In an embodiment, the method includes querying a second unit controller that has replaced the first unit controller. In addition, the method includes determining that the second unit controller lacks personality data, wherein the personality data comprises data that is unique to the first unit. Further, the method includes transferring the personality data to the second unit controller from a memory of the climate control system that is separate from the second unit controller.

Other embodiments disclosed herein are directed to a non-transitory machine-readable medium. In an embodiment, the non-transitory machine-readable medium includes instructions, that when executed by a processor, cause the processor to: (a) query a second unit controller of a first unit of a climate control system for personality data, wherein the second unit controller has replaced a first unit controller of the first unit, and wherein the personality data comprises data that is unique to the first unit; (b) determine that the second unit controller lacks the personality data; and (c) transfer the personality data to the second unit controller from a memory of the climate control system that is separate from the second unit controller.

Still other embodiments disclosed herein are directed to a method of controlling a climate control system. In an embodiment, the method includes (a) receiving personality data from a first unit controller of a first unit of the climate control system, wherein the personality data comprises data that is unique to the first unit. In addition, the method includes (b) storing the personality data on a memory that is separate from the first unit controller. Further, the method includes (c) replacing the first unit controller with a second unit controller, and (d) transferring the personality data of the first unit from the memory to the second unit controller. Still further, the method includes (e) selecting an operational parameter for the first unit based on the personality data after (c) and (d).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 3 is a flow chart for repairing a climate control system according to some embodiments.

DETAILED DESCRIPTION

Figure 1:
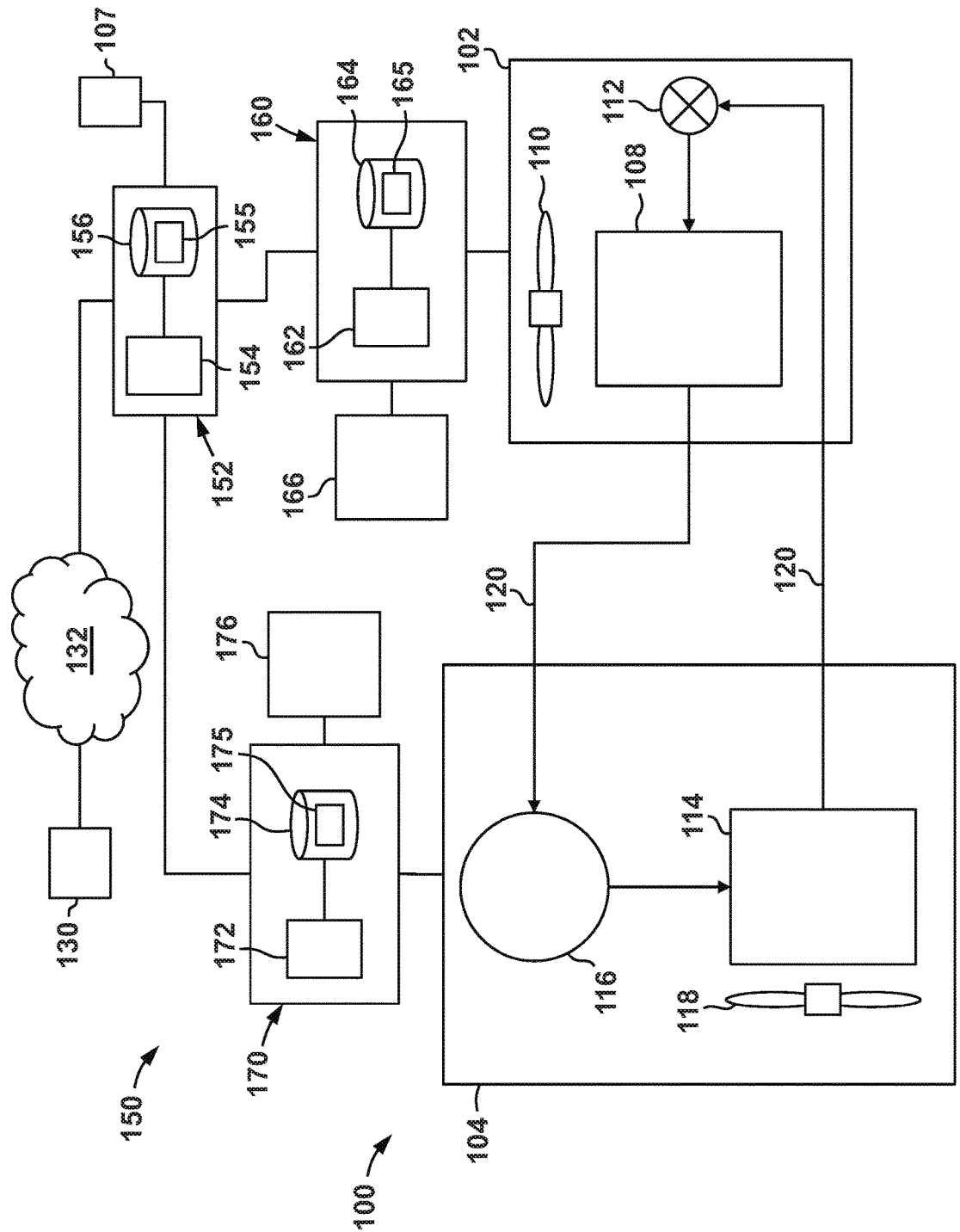
FIG. 1 is a diagram of a climate control system according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about,"

"generally," "substantially," "approximately," and the like mean within a range of plus or minus 10% unless otherwise stated herein.

As used herein, a "climate control system" refers to any system, component, or collection of components that is to alter or affect the climate conditions (e.g., temperature, relative humidity, etc.) within a defined space (e.g., an interior space of a home, office, retail store, etc.). The term "climate control system" specifically includes (but is not limited to) air-conditioning systems, heat pump systems, heaters, furnaces, dehumidification systems, HVAC systems, etc. In some climate control systems, a refrigerant may be circulated so as to affect the climate conditions within the defined space. As used herein a "refrigerant" may refer to any suitable fluid (e.g., heterogeneous fluid, homogeneous fluid, etc.) for use within a refrigeration cycle that may be incorporated within a climate control system, and may comprise chlorofluorocarbons, hydrochlorofluorocarbons, hydrofluorocarbons, hydrocarbons, hydrofluoroolefins, or some combination thereof.

As previously described, a climate control system may include one or more controllers that are configured to communicate with one or more units of the climate control system so as to direct the operation of the units and therefore ultimately support the climate control system's functionality and performance. Each unit of the climate control system may include so-called "personality data" that includes unique identifiers for that particular unit. The personality data may include a particular model identifier (e.g., name, number, etc.), serial number, and/or other identifying information that is unique to the particular unit in question. The personality data of a given unit may dictate the operational parameters (e.g., the target values for operation of various components, applied relationships for unit performance, lookup table data, etc.). Thus, the personality data of each unit of the climate control system may dictate the control schemes applied by the one or more controllers of the climate control system in order to achieve a desired performance or operation. In addition, the personality data may include information related to date(s) of manufacturing, installation, and/or sale of the particular unit, so that warranty information (e.g., such as warranty status) of a manufacturer's, installers, sellers, etc. warranty may be determined based (at least partially) on the personality data.

During the manufacturing process, the personality data of all of the units may be programmed into the appropriate memories of the climate control system. For instance, in some instances, personality data for each unit may be stored within a corresponding memory that is communicatively coupled to the corresponding unit, and this personality data may be accessed by one or more controllers of the climate controller during operations as needed. However, during the operating life of a climate control system, various components may need to be repaired or even replaced. For instance, replacement of a controller for one or more of the units of the climate control system is a common occurrence. Such replacement may result in a loss of the personality data for one or more of the units of the climate control system (e.g., due to removal of the controller and/or a so-called personality module coupled thereto). As a result, subsequent operations of the climate control system may be frustrated, because the personality data necessary for proper control of the unit's operation is now lost, and a technician may need to return to the work site to re-install the previously lost personality data.

Accordingly, embodiments disclosed herein include systems and methods for so-called "self-healing" within a climate control system (particularly within a control assembly thereof) as a result of a replacement of a memory, or controller, or other device that was the primary storage location for personality data of one or more of the units of the climate control system. Thus, through use of the systems and methods disclosed herein, the climate control system (or a controller thereof) may retain personality data that may otherwise have been lost during a repair or replacement operation.

Referring now to FIG. 1, a schematic diagram of a climate control system 100 according to some embodiments is shown. In this embodiment, climate control system 100 is a vapor compression air-conditioning system that is configured to cool (and possibly dehumidify) an indoor space (e.g., home, office, retail store, etc.) by circulating a refrigerant so as to transfer heat from the indoor space (not shown) to the outdoor environment. However, it should be appreciated that any suitable climate control system (e.g., such as those previously described above) may be utilized in other embodiments.

In this embodiment, the climate control system 100 generally comprises a first unit 102, and a second unit 104. In some embodiments, the first unit 102 may be disposed within a building or structure (e.g., such as within an attic, utility room, etc.), while the second unit 104 may be disposed outdoors. As a result, the first unit 102 may be referred to as an "indoor unit" 102, and the second unit 104 may be referred to as an "outdoor unit" 104. However, it should be appreciated that the location and arrangement of the units 102, 104 may be altered in other embodiments such that the example locations of units 102, 104 described herein should not be interpreted as limiting all potential placements or arrangements of the units 102, 104 in various embodiments. For instance, in some embodiments, the indoor unit 102 and the outdoor unit 104 may be located within the same housing, often exterior to the interior space that climate control system 100 is conditioning. Systems where the indoor unit 102 and the outdoor unit 104 are housed together are often referred to as packaged units.

Indoor unit 102 generally comprises an indoor air handling unit comprising an indoor heat exchanger 108, an indoor fan 110, and an indoor metering device 112. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of an indoor space (not shown). The indoor fan 110 may alternatively comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. Indoor metering device 112 may be configured to meter the volume and/or flow rate of refrigerant through the indoor metering device 112 during operations.

Referring still to FIG. 1, outdoor unit 104 generally comprises an outdoor heat exchanger 114, a compressor 116, and an outdoor fan 118. The outdoor heat exchanger 114 may generally be configured to promote heat transfer between a refrigerant carried within internal passages or tubing of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

As shown in FIG. 1, during operation the climate control system 100 is configured to circulate refrigerant between the indoor unit 102 and outdoor unit 104 (e.g., via lines 120) such that heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant flows to the indoor metering device 112, which may controllably expand the flow of refrigerant such that the refrigerant downstream of the indoor metering device 112 is at a lower pressure and temperature than the refrigerant upstream of the indoor metering device 112. From the indoor metering device 112, the refrigerant may enter the indoor heat exchanger 108. As the refrigerant is passed through the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow back to the compressor 116, where the refrigeration cycle may begin again.

During operations of the climate control system 100, the various operational parameters of the components of the indoor unit 102 and outdoor unit 104 (e.g., the speed, timing, etc. of the compressor 116, fans 118, 110, opening position of the indoor metering device 112, etc.) may be adjusted so as to achieve a desired operational performance. A desired operational performance of climate control system 100 may be defined in a number of different ways and according to a number of different parameters, such as, for instance, a desired cooling capacity, efficiency, cycle time, leaving air temperature, cooling rate, etc. Accordingly, climate control system 100 includes a control assembly 150 including one or more controllers that are to implement various control algorithms and methods for the various components of climate control system 100 so as to achieve the desired operating performance as previously described above.

In this embodiment, the control assembly 150 includes a first unit controller 160 coupled to the indoor unit 102, a second unit controller 170 coupled to the outdoor unit 104, and a system controller 152 coupled to each of the unit controllers 160, 170. Because the first unit controller 160 and second unit controller 170 are coupled to the indoor unit 102 and outdoor unit 104, respectively, the first unit controller 160 may be referred to herein as an "indoor unit controller" 160, and the second unit controller 170 may be referred to herein as an "outdoor unit controller" 170.

The system controller 152 may generally be configured to selectively communicate with indoor unit controller 160, outdoor unit controller 170, and/or other components of the climate control system 100. In some embodiments, the system controller 152 may be configured to control operation of the indoor unit 102 and/or the outdoor unit 104 via the indoor unit controller 160 and/or outdoor unit controller 170, respectively. In some embodiments, the system controller 152 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with climate control system 100.

The system controller 152 may also be in communication with or incorporated with an input/output (I/O) unit 107 (e.g., a graphical user interface, a touchscreen interface, or the like) for displaying information and for receiving user inputs. The I/O unit 107 may display information related to the operation of the climate control system 100 (e.g., from system controller 152) and may receive user inputs related to operation of the climate control system 100. During operations, I/O unit 107 may communicate received user inputs to the system controller 152, which may then execute control of climate control system 100 accordingly. In some embodiments, the I/O unit 107 may further be operable to display information and receive user inputs tangentially related and/or unrelated to operation of the climate control system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 152 may receive user inputs from remote configuration tools, and may further communicate information relating to climate control system 100 to I/O unit 107. In these embodiments, system controller 152 may or may not also receive user inputs via I/O unit 107. In some embodiments, the system controller 152 and/or the I/O unit 107 may be embodied in a thermostat that may be disposed within the indoor space.

In some embodiments, the system controller 152 may be configured to selectively communicate with other devices 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 and/or the other device 130 may also comprise a remote server.

The indoor unit controller 160 may be carried by the indoor unit 102 and may generally be configured to receive information inputs, transmit information outputs, and/or otherwise communicate with the system controller 152, the outdoor unit controller 170, and/or any other device (e.g., other device 130, I/O unit 107, etc.). In some embodiments, the indoor unit controller 160 may be coupled to an indoor personality module 166 that may comprise personality data that is unique to the indoor unit 102, as previously described above. In some embodiments, the indoor personality module 166 may be incorporated within the indoor unit controller 160 itself, such that the personality data of the indoor unit 102 may be stored on a memory device of the indoor unit controller 160 (e.g., memory 164 described below).

The outdoor unit controller 170 may be carried by the outdoor unit 104 and may generally be configured to receive information inputs, transmit information outputs, and/or otherwise communicate with the system controller 152, the indoor unit controller 160, and/or any other device (e.g., other device 130, I/O unit 107, etc.). In some embodiments, the outdoor unit controller 170 may be coupled to an outdoor personality module 176 that may comprise personality data that is unique to the outdoor unit 104, as previously described above. In some embodiments, the outdoor personality module 176 may be incorporated within the outdoor unit controller 170 itself, such that the personality data of the outdoor unit 104 may be stored on a memory device of the outdoor unit controller 170 (e.g., memory 174 described below).

System controller 152, indoor unit controller 160, and outdoor unit controller 170 may each comprise any suitable electric control unit or assembly. Generally speaking, each of the controllers 152, 160, 170 may each comprise any suitable device or assembly which is capable of receiving electrical (or other data) signals and transmitting electrical (or other data) signals to other devices. In particular, controllers 152, 160, 170 may each generally include a processor 154, 162, 172 and a memory 156, 164, 174, respectively. The processors 154, 162, 172 (e.g., microprocessor, central processing unit, or collection of such processor devices, etc.) may execute machine-readable instructions 155, 165, 175 provided on the corresponding memory 156, 164, 174, respectively, (e.g., non-transitory machine-readable medium) to provide the processors 154, 162, 172, respectively, with all of the functionality described herein. The memories 156, 164, 174 of controllers 152, 160, 170, respectively may comprise volatile storage (e.g., random access memory), non-volatile storage (e.g., flash storage, read only memory, etc.), or combinations of both volatile and non-volatile storage. Data consumed or produced by the machine-readable instructions, 155, 165, 175 can also be stored on the memories 156, 164, 174, respectively.

Controllers 152, 160, 170 may communicate with one another and with other components of (or in communication with) climate control system 100 (e.g., I/O unit 107, other device 130, network 132, indoor unit 102, outdoor unit 104, etc.) via any suitable medium of communication. For instance, controllers 152, 160, 170 may communicate with one another and other components (e.g., such as those mentioned above) via wireless communications (e.g., radio frequency communication, WIFI, BLUETOOTH®, infrared communication, acoustic communication, etc.), wired communication (e.g., metallic wire, fiber optic cable, etc.), or a combination thereof.

Referring still to FIG. 1, during operation of the climate control system 100 (e.g., as refrigerant is circulated between the indoor unit 102 and outdoor unit 104 as previously described above), the control assembly 150 may select or adjust various operating parameters of the components of climate control system 100 as generally described above. More particularly, in some embodiments, the control assembly 150 (including the system controller 152, indoor unit controller 160, outdoor unit controller 170) may receive measured variables such as, for instance pressure, temperature, humidity, flow rate, etc. (or measurements or values that are indicative of these variables), and may implement various control algorithms, relationships, methods, conversions, etc. so as to adjust one or more operational parameters of the components of climate control system 100. For example, during operations control assembly 150 may determine a temperature of the refrigerant within the indoor heat exchanger 108, and based on this temperature, may adjust a position of the indoor metering valve 112, a speed of the indoor fan 110, outdoor fan 118, compressor 116, etc. so as to achieve or maintain a target value of the refrigerant temperature within the indoor heat exchanger 108.

During these operations, the personality data supplied from the personality modules 166, 176 may be utilized to determine how and what adjustments may be made to the components of the climate control system 100 in order to achieve the desired operational performance as described above. Specifically, system controller 152, indoor unit controller 160, and/or outdoor unit controller 170 may utilize the personality data of either the indoor unit 102 or the outdoor unit 104 so as to determine what relationships, algorithms, methods, conversions, etc. to apply so as to effect the overall performance of the climate control system 100 in the desired manner. Thus, without this personality data, the control assembly 150 may be unable to perform (or efficiently perform) control operations for the climate control system 100 as described above.

At some point, it may become necessary or desirable to replace the indoor unit controller 160 and/or the outdoor unit controller 170. For instance, one or more of the unit controllers 160, 170 may become damaged (e.g., due to an electrical power surge, physical damage, water damage, etc.) or may otherwise cease to work properly or at all within the climate control system 100. In some instances, one or both of the indoor unit 102 and the outdoor unit 104 may be replaced with a different (e.g., newer) model or type that requires a different design or type of unit controller (e.g., unit controllers 160, 170). Regardless of the precise reason, if one or both of the unit controllers 160, 170 is replaced within climate control system 100, they are typically replaced with a generic replacement controller that includes no personality data of the corresponding unit (e.g., indoor unit 102, outdoor unit 104). Specifically, if the personality data is stored on a separate personality module, such as personality modules 166, 176, the technician may mistakenly dispose of the personality module 166, 176 along with the damaged, obsolete, or non-working unit controller 160, 170, respectively. Alternatively, in embodiments where the personality data is stored directly on the memories 165, 175 of the unit controllers 160, 170, respectively, the personality data is also lost when the damaged, obsolete, or non-working unit controller 160, 170 is removed and discarded.

As a result, following the installation of a new or replacement unit controller 160, 170, a technician will then need to obtain suitable personality data (e.g., via purchase and installation of a new personality module, installation of the appropriate personality data on the memory of the newly installed unit controller, etc.) before operations with climate control system 100 may resume. In some instances, because personality data is often overlooked by a service technician, a return trip may need to be scheduled for the technician to the worksite in order to subsequently install or input the required personality data as described above. Accordingly, as will be described in more detail below, the embodiments disclosed herein include methods and techniques for internally retaining the personality data of the various units (e.g., indoor unit 102, outdoor unit 104) of the climate control system 100 so that if a unit controller 160, 170 is later replaced and suitable personality data is not included with the replaced unit controller, the climate control system 100 (and particularly the control system 150) may retrieve the previously stored personality data and transfer it to the replacement unit controller. As a result, the control system 150 of climate control system 100 may be self-healing with respect to the retrieval of otherwise lost personality data following a unit controller replacement. Further details of embodiments of these methods are now described below. In order to better describe the features of these methods, continuing reference will be made to the climate control system 100 shown in FIG. 1 and described above, and the features of the following methods may be described with specific reference to the components of climate control system 100. However, it should be appreciated that the following methods may be applied to any suitable climate control system that utilizes personality data for the operation of the units and components therein. Accordingly, any reference to the climate control system 100 in the following description is meant merely to clarify and explain the features of the disclosed methods via a particular implementation, and should therefore not be interpreted as limiting all potential uses and implementations of the disclosed methods.

Figure 2:
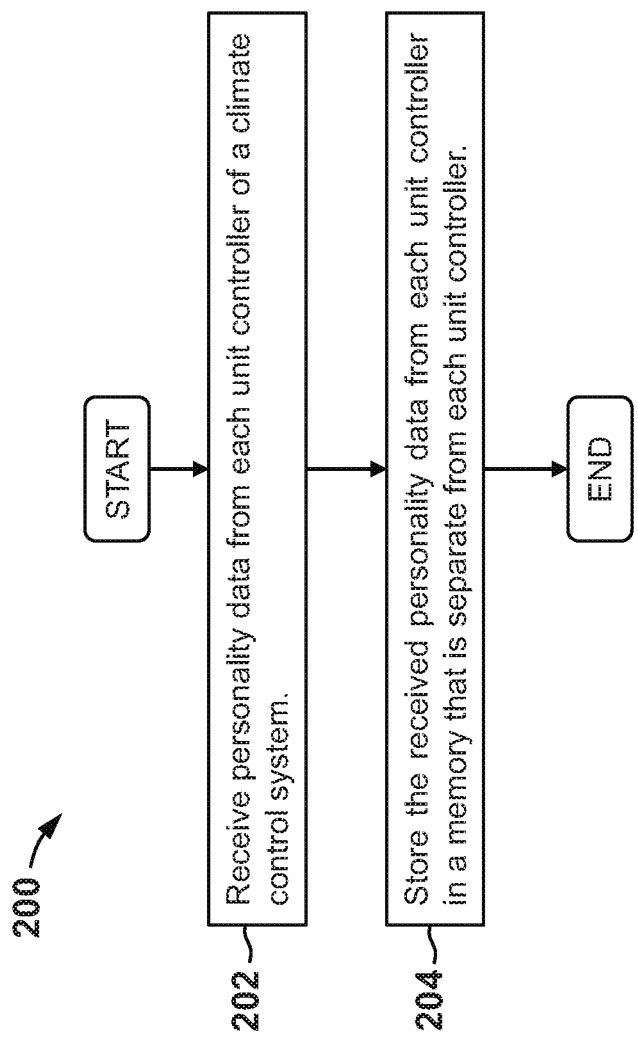
FIG. 2 is a flow chart of operating a climate control system according to some embodiments.

Referring now to FIG. 2, a method 200 of operating a climate control system (e.g., climate control system 100) is shown. In some embodiments, method 200 may represent a method of operating the climate control system upon initial power up of the system following installation. However, it should be appreciated that method 200 may be performed at any point during the operation of the climate control system. In some embodiments, the method 200 may be repeatedly performed throughout the operational life of the climate control system, such as, for instance, at regular time intervals (e.g., days, months, years, etc.), after a loss of electrical power to one or more components of the climate control system, etc.

Initially, method 200 includes receiving personality data from each unit controller of a climate control system at block 202. Specifically, in the climate control system 100 of FIG. 1, the personality data may be received from the indoor unit controller 160 and outdoor unit controller 170, which may obtain the personality data from the memories 165, 175, or via the personality modules 166, 176 coupled to the unit controllers 160, 170, respectively. The personality data may be received within another controller of the climate control system 100, such as in the system controller 152, and/or may be received by one or more other devices, such as, for instance other device 130, I/O unit 107, etc. In some embodiments, the personality data of one unit 102, 104 may be received by the unit controller 160, 170 of the other unit 102, 104, respectively at block 202.

Referring still to FIG. 2, method 200 next includes storing the received personality data from each unit controller in a memory that is separate from each corresponding unit controller at block 204. In some embodiments, method 200 includes storing the received personality data in non-volatile storage. For the climate control system 100 of FIG. 1, the personality data received from the unit controllers 160, 170 may be stored on the memory 156 of system controller 152 and/or suitable memories of the other device 130, I/O unit 107, etc. In some embodiments, the personality data received from one unit (e.g., the indoor unit 102, outdoor unit 104) may be stored on the memory of a unit controller (e.g., unit controllers 160, 170) of another unit within the climate control system 100. In some embodiments, the personality data of each unit (e.g., indoor unit 102, outdoor unit 104 of the climate control system 100) may be stored on a plurality of different memories within the climate control system at block 204.

Referring again to FIG. 2, following the storage of the personality data at block 204, method 200 ends. Thereafter, normal operations with the climate control system may be conducted. For the climate control system 100 of FIG. 1, during these post-method 200 operations, the control assembly 150 may control the various operating parameters of the climate control system 100 utilizing the personality data as stored in the unit controllers 160, 170 (and/or personality modules 166, 176) as previously described above.

Referring now to FIG. 3, a method 300 of repairing a climate control system (e.g., climate control system 100) is shown. In some embodiments, method 300 may be performed after the method 200 (FIG. 2) was previously performed.

Initially, method 300 includes replacing a first unit controller of a first unit of a climate control system with a second unit controller at 302. For instance, in the climate control system 100 of FIG. 1, block 302 may comprise replacing at least one of the unit controllers 160, 170 of the indoor unit 102, outdoor unit 104, respectively. As previously described, such a replacement may be completed so as to replace a damaged or otherwise non-functioning unit controller, as part of a general replacement of one of the indoor unit 102, outdoor unit 104, etc. The "second unit controller" in block 302 may correspond to a replacement unit controller that is to replace either the indoor unit controller 160 or the outdoor unit controller 170.

Referring again to FIG. 3, method 300 next includes querying the second unit controller for personality data of the first unit at 304. For the climate control system 100 of FIG. 1, block 304 may comprise querying the replacement unit controller (e.g., a replacement of the indoor unit controller 160, outdoor unit controller 170, etc.) for personality data of the corresponding unit (e.g., indoor unit 102, outdoor unit 104, etc.). In some embodiments, the system controller 152 may query to new unit controller for personality data, or another device of or coupled to the climate control system 100 may query the new unit controller at block 304 (e.g., such as device 130, I/O unit 107, etc.).

Referring again to FIG. 3, method 300 next includes determining whether the second unit controller has personality data of the first unit at 306 as a result of the query at block 304. For the climate control system 100 in FIG. 1, if the replacement unit controller of either the indoor unit controller 160 or the outdoor unit controller 170 (i.e., the "second unit controller" in method 300) does include personality data either in a coupled personality module (e.g., personality modules 166, 176) or stored within the memory of the replacement unit controller (e.g., memories 165, 175), then the determination at block 306 is that the replacement control unit does include personality data of the corresponding unit. If, on the other hand, the replacement unit controller does not include personality data either in a coupled personality module or stored within the memory of the replacement unit controller, then the determination at block 306 is that the replacement unit controller does not include personality data of the corresponding unit.

Returning to FIG. 3, if the determination at block 306 is "yes" (i.e., the second unit controller does include personality data of the first unit), then method 300 proceeds to block 308 and the personality data stored on the second unit controller is stored on a memory that is separate from the second unit controller. Specifically, as is similarly described above for block 204 of method 200 (FIG. 2), if the second control unit includes personality data of the first unit (e.g., either because it was previously installed onto a memory of the second unit controller or was included in a personality module that is coupled to the second unit control unit as previously described), then it may be presumed (at least for purposes of the method 300) that the second unit controller is a controller of a new or different first unit (i.e., different in model, type, arrangement, etc. than the original first unit included within the climate control system). Thus, upon determining that the second unit controller has personality data for the first unit, the personality data is retrieved and stored on a memory that is separate from the second unit controller itself. For instance, for the climate control system 100 of FIG. 1, the newly obtained personality data may be retrieved from the second unit controller and stored (e.g., in non-volatile storage) on the memory 156 of system controller 152 and/or suitable memories of the other device 130, I/O unit 107, etc. In addition, as was previously described above, in some embodiments, the personality data of the unit associated with the replaced unit controller (i.e., the "second unit" controller in method 300) may be stored on the memory of the other unit controllers within the climate control system (e.g., such as unit controller 160, 170, etc.) either in lieu of or in addition to the memory of the system controller 152, device 130, I/O unit 107, etc. In some embodiments, the personality data of the unit associated with the replaced unit controller may overwrite any previously stored personality data of the unit already stored on the memory at block 308 (e.g., such as personality data that was previously stored via block 204 in method 200 in FIG. 2) so as to avoid duplicate (and possibly inconsistent) personality data for the unit on the memory.

If, on the other hand, the determination at block 306 is "no" (i.e., the second unit controller does not include personality data of the first unit), then method 300 proceeds to block 310 in which personality data of the first unit is transferred to the second unit controller from a memory that is separate from the second unit controller. The memory at block 310 may be any one or more of the same memories mentioned above for block 308. Thus, for the climate control system 100 of FIG. 1, the memory at block 310 may comprise the memory 156 of system controller 150, device 130, I/O unit 107, the memories 164, 174 of unit controllers 160, 170, etc. In some embodiments, the personality data that is transferred from the separate memory at block 310 may have been previously stored within the separate memory via performance of the method 200 in FIG. 2. In other embodiments, the personality data that is transferred from the separate memory may have been previously stored in the separate memory during the initial construction or installation of the climate control system 100 (i.e., prior to first operation or energization of the climate control system 100). Thus, if it is determined that the replaced unit controller does not have personality data for the corresponding unit (e.g., at block 308) then it may be determined (at least for purposes of method 300) that the unit coupled to the newly replaced unit controller (i.e., the so-called "second unit controller" in method 300) is the same unit that was coupled to the original or previously utilized unit controller (i.e., the so-called "first unit controller" in method 300) so that the previously stored personality data may be utilized to operate the unit following the replacement of the unit controller as described above.

Referring again to FIG. 3, following both blocks 308 and 310, in some embodiments method 300 proceeds to block 312 to select at least one operating parameter for the first unit based on the personality data of the first unit from either the second unit controller or the memory. Specifically, if method 300 progresses to block 312 via block 308, then the personality data utilized at block 312 comprises the personality data that was retrieved from the second unit controller as described for block 308. If, on the other hand, method 300 progresses to block 312 via block 310, then the personality data utilized at block 312 comprises the personality data that was retrieved from the separate memory and transferred to the second unit controller as described for block 310.

In some embodiments, method 300 may also include storing personality data of a second unit of the climate control system (i.e., personality data that is unique to the second unit) on the second unit controller of the first unit. As a result, once the personality data of the second unit is stored on the second unit controller of the first unit, the second unit controller may thereafter provide the personality data of the second unit to a replacement unit controller of the second unit (e.g., such as in the manner described above for block 310).

In some embodiments, following both blocks 308 and 310, method 300 may proceed to determine a warranty status for the first unit based on the personality data of the first unit from either the second unit controller or the memory. Specifically, as previously described, personality data may include information related to the date of manufacturing, installation, and/or sale of a unit (e.g., the first unit) such that a warranty status (e.g., whether the first unit is currently covered under a manufacturers and/or installer's warranty) may be determined based on the personality data.

Embodiments disclosed herein include systems and methods for so-called "self-healing" within a climate control system as a result of a replacement of a memory or controller within the climate control system that was the primary storage location for personality data of one or more of the units of the climate control system. Thus, through use of the systems and methods disclosed herein, the climate control system (or a controller thereof) may retain personality data that may otherwise have been lost during a repair or replacement operation.

While embodiments disclosed herein have specifically described a climate control system 100 that is configured as a vapor-compression air-conditioning system, it should be appreciated that other types of climate control systems may be utilized in some embodiments. For instance, in some embodiments, the climate control system 100 may be configured as a so-called "heat pump" whereby the flow direction of the refrigerant may be reversed from that shown in FIG. 1 and described above so as to increase a temperature of the indoor space (not shown). In these embodiments, the climate control system 100 may additionally include a so-called reversing valve that is to selectively reverse the flow direction of the refrigerant between the indoor unit 102 and outdoor unit 104. In addition, in these embodiments, the climate control system 100 may also include an outdoor metering device within the outdoor unit 104 that is substantially similar to the indoor metering device 112 described above, and that is to controllably meter the flow of refrigerant before it enters the outdoor heat exchanger 114.

In addition, as previously described above, some embodiments of climate control system 100 may comprise a so-called "packaged unit," whereby the indoor unit 102 and the outdoor unit 104 may be located within the same housing. However, during the operational life of such a climate control system, replacement of a unit controller of either the indoor unit 102 and/or outdoor unit 104 (e.g., by replacement of the entire packaged unit or a portion thereof) may result in the loss of personality data in substantially the same manner as described above. Thus, embodiments of methods 200, 300 may be performed so as to allow a climate control system employing a packaged unit to "self-heal" and thus retrieve the otherwise lost personality data in substantially the same manner as described above.

In other embodiments, the systems and methods disclosed herein may also apply to a heater (e.g., electric coil heater, combustion furnace, etc.). In these embodiments, a replacement of a unit controller for a unit of the heater (e.g., a unit control unit for the electric coil heater, combustion furnace, etc.) may result in the loss of personality data in a similar manner to that described above for the indoor unit 102 and outdoor unit 104 of climate control system 100. As a result, embodiments of methods 200, 300 may be performed so as to allow the heater to "self-heal" and thus retrieve the otherwise lost personality data in substantially the same manner as described above.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of repairing a climate control system, the climate control system comprising a system controller and a first unit, the first unit including a first unit controller separate from the system controller, the method comprising:
   (a) querying a second unit controller that has replaced the first unit controller;
   (b) determining that the second unit controller lacks personality data, wherein the personality data comprises data that is unique to the first unit;
   (c) transferring the personality data to the second unit controller from a memory of the climate control system that is separate from the second unit controller;
   (e1) controlling the operation of the first unit using the second unit controller;
   (e2) selecting an operational parameter for the first unit based on the personality data transferred to the second unit controller; and
   (e3) operating the first unit at a speed of a fan or a compressor of the first unit based on the operation parameter selected.

2. The method of claim 1, comprising:
   (d) storing the personality data on the second unit controller.

3. The method of claim 1, wherein the memory is a memory of the system controller.

4. The method of claim 1, wherein the memory is a memory of a third unit controller of a second unit of the climate control system.

5. The method of claim 4, comprising transferring second unit personality data to the second unit controller, wherein the second unit personality data comprises data that is unique to the second unit.

6. The method of claim 1, wherein the first unit includes a heat exchanger that is configured to receive a flow of refrigerant therethrough.

7. The method of claim 1, wherein the personality data includes a serial number of the first unit.

8. The method of claim 1, wherein (e1) further comprises selecting the operational parameter using the system controller.

9. The method of claim 1, wherein the personality data includes an installation date for the first unit, and the method further includes transmitting the installation date to a communication network.

10. A non-transitory machine-readable medium including instructions, that when executed by a processor, cause the processor to:
    (a) query a second unit controller of a first unit of a climate control system for personality data, wherein the second unit controller has replaced a first unit controller of the first unit, and wherein the personality data comprises data that is unique to the first unit;

(b) determine that the second unit controller lacks the personality data;

(c) transfer the personality data to the second unit controller from a memory of the climate control system that is separate from the second unit controller;

(d) control the operation of the first unit using the second unit controller;

(e) select an operational parameter for the first unit based on the personality data transferred in (c); and (f) operate the first unit at a speed of a fan or a compressor of the first unit based on the operation parameter selected.

11. The non-transitory machine-readable medium of claim 10, wherein the personality data comprises a serial number of the first unit.

12. The non-transitory machine-readable medium of claim 10, wherein the instructions, when executed by the processor, further cause the processor to:

(g) retrieve and store the personality data from the first unit controller on the memory before (a)-(c).

13. The non-transitory machine-readable medium of claim 10, wherein (e) further causes the processor to select the operational parameter using a system controller.

14. The non-transitory machine-readable medium of claim 10, wherein the personality data includes an installation date for the first unit, and the method further includes transmitting the installation date to a communication network.

15. A method of controlling a climate control system, the method comprising:

(a) receiving personality data from a first unit controller of a first unit of the climate control system, wherein the personality data comprises data that is unique to the first unit;

(b) storing the personality data on a memory that is separate from the first unit controller;

(c) replacing the first unit controller with a second unit controller;

(d) transferring the personality data of the first unit from the memory to the second unit controller;

(e) selecting an operational parameter for the first unit based on the personality data after (c) and (d); and (f) operating the first unit at a speed of a fan or a compressor of the first unit based on the operation parameter selected.

16. The method of claim 15, wherein the memory is disposed within a system controller of the climate control system that is separate from the first unit controller and the second unit controller.

17. The method of claim 15, wherein the memory is disposed within a third unit controller of a second unit of the climate control system.

18. The method of claim 15, wherein the first unit includes a heat exchanger configured to receive a flow of refrigerant therethrough.

19. The method of claim 15, wherein the personality data of the first unit comprises a serial number of the first unit.

20. The method of claim 15, wherein (e) further comprises selecting the operational parameter using a system controller.

* * * * *